United States Patent
Benisty et al.

(10) Patent No.: US 10,248,587 B2
(45) Date of Patent: Apr. 2, 2019

(54) REDUCED HOST DATA COMMAND PROCESSING

(71) Applicant: SanDisk Technologies Inc., Plano, TX (US)

(72) Inventors: Shay Benisty, Beer Sheva (IL); Tal Sharifie, Lehavim (IL); Girish Desai, Cuppertino, CA (US); Oded Karni, Sunnyvale, CA (US)

(73) Assignee: SanDisk Technologies LLC, Plano, TX (US)

( * ) Notice: Subject to any disclaimer, the term of this patent is extended or adjusted under 35 U.S.C. 154(b) by 1039 days.

(21) Appl. No.: 14/075,905

(22) Filed: Nov. 8, 2013

(65) Prior Publication Data

US 2015/0134871 A1 May 14, 2015

(51) Int. Cl.
G06F 13/28 (2006.01)
G06F 13/16 (2006.01)

(52) U.S. Cl.
CPC .......... G06F 13/1673 (2013.01); G06F 13/28 (2013.01)

(58) Field of Classification Search
CPC .................................................... G06F 13/28
USPC ........................................................ 710/38
See application file for complete search history.

(56) References Cited

U.S. PATENT DOCUMENTS

| | | | | |
|---|---|---|---|---|
| 8,554,963 | B1 * | 10/2013 | Shapiro | G06F 15/17331 709/203 |
| 8,819,304 | B2 * | 8/2014 | Shapiro | G06F 15/17331 709/203 |
| 8,949,486 | B1 * | 2/2015 | Kagan | G06F 13/28 710/22 |
| 9,003,071 | B2 * | 4/2015 | Liu | G06F 13/16 710/3 |
| 2003/0070036 | A1 | 4/2003 | Gorobets | |
| 2007/0022225 | A1 | 1/2007 | Nair et al. | |
| 2008/0005386 | A1 * | 1/2008 | Matsuda | G06F 13/28 710/22 |
| 2010/0082849 | A1 | 4/2010 | Millet et al. | |
| 2011/0161559 | A1 | 6/2011 | Yurzola et al. | |

FOREIGN PATENT DOCUMENTS

EP  2 133 797 A1  12/2009
EP  2 365 444 A1  9/2011

OTHER PUBLICATIONS

International Search Report, dated Apr. 17, 2014, International Application No. PCT/IB2013/002493, pp. 1-4, European Patent Office, Rijswijk, The Netherlands.
"NVM Express," dated Sep. 23, 2013, pp. 1-166, Intel Corporation, available at http://nvmexpress.org.

\* cited by examiner

Primary Examiner — Titus Wong
(74) Attorney, Agent, or Firm — Brinks Gilson & Lione

(57) ABSTRACT

Methods and systems are provided that execute reduced host data commands. A reduced host data command may be a write command that includes or is received with an indication of host data instead of the host data. The reduced host data command may be executed with a Direct Memory Access (DMA) circuit independently of a processor that executes administrative commands. In the execution of the reduced host data command, host data may be generated, metadata may be generated, and the generated host data and/or metadata may be copied into backend memory with the DMA circuit independently of the processor.

20 Claims, 2 Drawing Sheets

REDUCED HOST DATA COMMAND PROCESSING

BACKGROUND

1. Technical Field

This application relates to generally to device controllers.

2. Related Art

A storage device in a storage system may receive data from a host over a bus. The storage device may store the data in memory for later retrieval. The storage device may receive commands from the host to store or retrieve data. The commands may conform to a bus protocol, such as a protocol set forth by a Non Volatile Memory Express (NVME) standard. The NVM Express standard describes a register interface, command set, and feature set for PCI Express (PCIE®)-based Solid-State Drives (SSDs). PCIE is a registered trademark of PCI-SIG Corporation of Portland Oreg.

SUMMARY

A storage system may be provided that includes a buffer, a processor, a direct memory access (DMA) circuit, and a backend memory for data storage. The buffer may store host data when the host data is received from a host over a bus. The DMA circuit may include a data generator and a metadata generator. The data generator may generate the host data when the host data is not received from the host. The DMA circuit may copy the host data generated by the data generator to the backend memory independently of the processor when the host data is not received from the host, and may copy the host data in the buffer to the backend memory independently of the processor when the host data is received from the host. The metadata generator may generate the metadata from the host data that is in the buffer when the host data is received from the host and may generate the metadata from the host data that is generated by the data generator when the host data is not received from the host.

A bus controller may be provided that includes a buffer, a data generator, a metadata generator, and a Direct Memory Access (DMA) circuit. The buffer may store host data when the host data is received over a bus. The data generator may generate the host data when an indication of host data is received over the bus instead of the host data. The metadata generator may generate metadata based on the host data in the buffer when the host data is received over the bus and generate the metadata based on the host data generated by the data generator when the indication of host data is received over the bus instead of the host data. The DMA circuit may write the metadata and/or the host data, which is generated by the data generator or received over the bus, into a backend memory.

A method may be provided that processes reduced host data commands. A reduced host data command may be executed with a Direct Memory Access (DMA) circuit independently of a processor that executes administrative commands. The reduced host data command may be received over a bus. In the execution of the reduced host data command, host data may be generated, metadata may be generated, and the generated host data and/or the generated metadata may be copied into the backend memory with the DMA circuit. The host data may be generated based on an indication of host data received over the bus. The metadata may be generated based on the host data.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
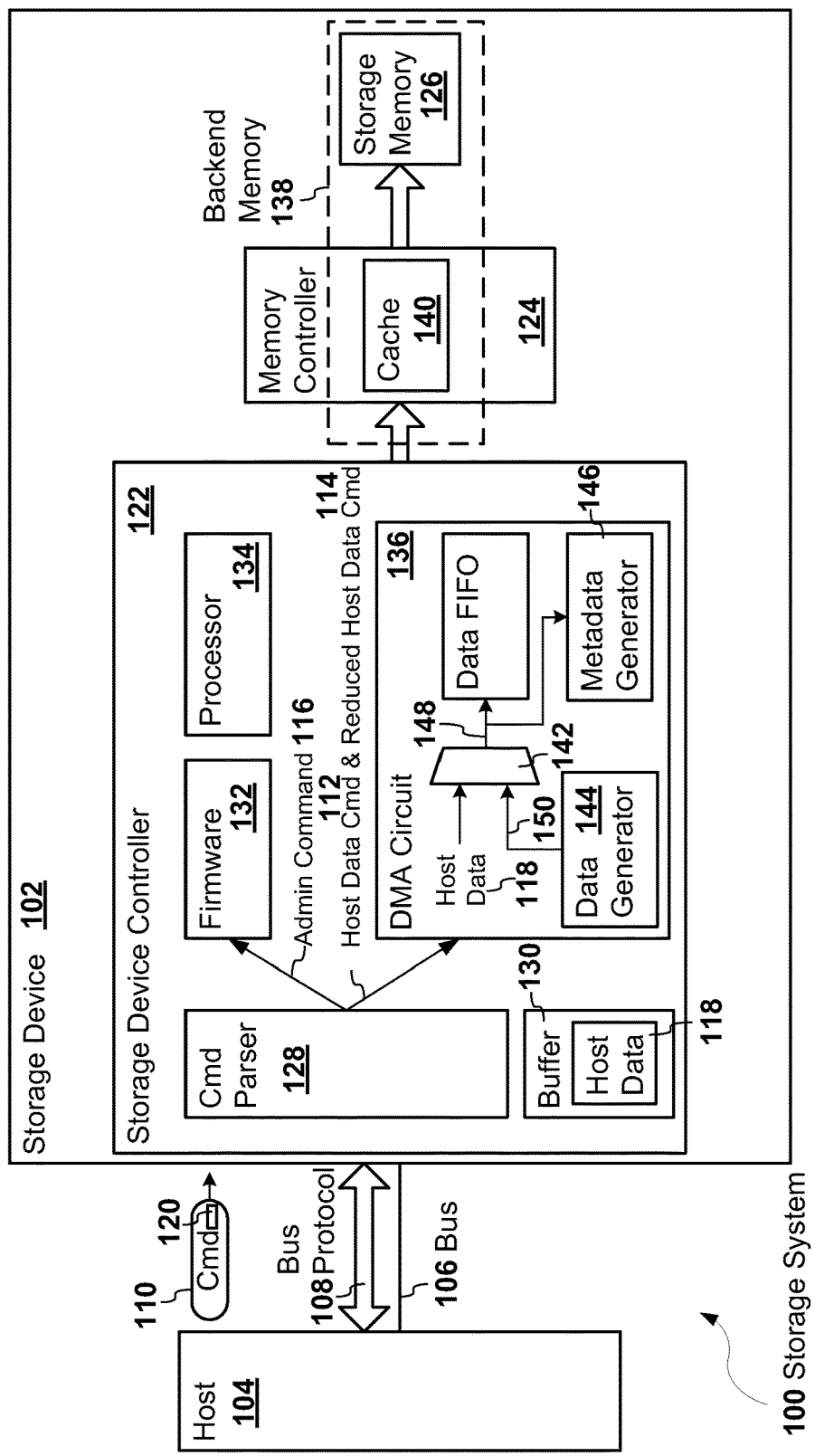
FIG. 1 illustrates an example of a storage system that processes reduced host data commands.

The NVME standard may be applied over PCIE® and describes a command set for accessing a SSD. A subset of commands in the NVME standard or other bus protocol standards may be implemented or executed by hardware or hardware acceleration. For example, read and write commands may be accelerated by hardware in order to increase performance. A storage device controller may be located between the host and storage memory, such as flash memory. The storage device controller may implement or execute the pus protocol commands. For example, when the host issues a write command for a first set of data, the storage device controller may receive the first set of data from the host, perform management and control operations, and write a second set of data to the storage memory. The first set of data may include host data but, in some configurations, may not include metadata, such as cyclical redundancy check protection data. In alternative configurations, the first set of data may include the metadata. When the metadata is included in the first set of data, then the storage device controller may generate expected metadata and compare the generated metadata with the metadata received from the host. When the metadata is not included in the first set of data received from the host, then the storage device controller may generate the metadata and include both the host data and the metadata in the second set of data written to the storage memory.

In order to enhance performance, the NVME standard and other bus protocols may include pseudo write commands. For example, if the first set of data includes all zeros, then a pseudo write command, such as a write zeros command, may be sent from the host device to the storage device controller without receiving the host data—which is all zeros—from the host over the bus. The storage device controller, upon receiving the write zeros command, may generate the zeros and the metadata, and write the zeros and the associated metadata to the storage memory.

In one example, a method is provided to process a reduced host data command, such as a write zeros command or other pseudo write command. The reduced host data command may be executed with a Direct Memory Access (DMA) circuit independently of a processor that executes other types of commands, such as administrative commands. In the execution of the reduced host data command, host data may be generated, metadata may be generated, and the generated host data and the generated metadata may be copied into backend memory with the DMA circuit. The host data may be generated based on an indication of host data received over the bus. For example, the reduced host data command may include an indication of a pattern to generate. The metadata may be generated based on the generated host data.

One technical advantage of the systems and methods described below is that the metadata generator does not need to be duplicated. For example, the metadata generator does not need to be implemented both in the DMA circuit and in firmware executed by the processor that executes other types of commands. Another technical advantage of the systems and methods described below is that executing a reduced host data command may be faster than a system in which a processor that executes administrative commands also executes the reduced host data commands.

FIG. 1 illustrates an example of a storage system 100 that processes reduced host data commands. The storage system 100 may include a storage device 102 and a host 104. Communication between the storage device 102 and the host 104 may be over a bus 106. The communication over the bus 106 may conform to a bus protocol 108.

The storage device 102 may be any device that stores computer-readable data. Examples of the storage device 102 may include a Solid State Device (SSD), a flash drive, a hard drive, a Universal Serial Bus (USB) drive, a peripheral that stores data received from the host 104, or any other component that stores data from the host 104.

The host 104 may be any device that communicates with the storage device 102 over the bus 106. Examples of the host 104 may include a computer, a laptop computer, a mobile device, a desktop computer, a cell phone, or any other processor based device. The host 104 may be physically discrete from the storage device 102. Alternatively, the storage device 102 may be included in or otherwise integrated with the host 104.

The bus 106 may be any communication system that transfers data between hardware components, such as between the host 104 and the storage device 102. The bus 106 may include one or more wires that transport signals between the host 104 and the storage device 102. Alternatively or in addition, the bus 106 may include one or more wireless channels that transport signals between the host 104 and the storage device 102. Examples of the bus 106 may include a parallel bus, a serial bus, a Universal Serial Bus (USB), a peripheral bus, a storage bus, a PCI Express bus, a Small Computer System Interface (SCSI) bus, a Serial Advanced Technology Attachment (SATA) bus or any other bus configured to communicate data to and from storage devices.

The bus protocol 108 may be any communications protocol for data transmission over the bus 106. Examples of the bus protocol 108 may include a NVM Express protocol, a Small Computer System Interface (SCSI) protocol, a Serial Advanced Technology Attachment (SATA) protocol, or any other protocol for communication with a block storage device.

The bus protocol 108 may support one or more bus protocol commands. A bus protocol command 110 supported or described by the bus protocol 108 may be a host data command 112, a reduced host data command 114, an administrative command 116, or any other type of command.

The host data command 112 may be any command that includes, or is transmitted with, host data 118 that is copied from the host 104 to the storage device 102 for storage in the storage device 102. The host data 118 may be destined for storage in one or more logical data blocks (LBAs) of the storage device 102. Examples of the host data command 112 may include a block write command and a page write command.

In contrast, the reduced host data command 114 may be a write command that includes or is received with an indication 120 of host data instead of the host data 118. The indication 120 of host data may be smaller in size than the host data 118. For example, the reduced host data command 114 may be a write zeros command that indicates a set of zeros should be stored in the storage device 102 for the host 104. In other words, the reduced host data command 114 itself may be the indication 120 of host data. In another example, the reduced host data command 114 may be any other type of pseudo write command. The pseudo write command may include a description of the host data 118 to be written to one or more logical blocks in the storage device 102. The pseudo write command may include, for example, an initial address, a length of the pattern, and/or a pattern identifier that identifies the pattern to be generated starting at the initial address. The initial address may be an address of a logical block in the storage device 102. In yet another example, the reduced host data command 114 may be a write compressed data command that includes or is otherwise transmitted with compressed data, which is subsequently stored in an uncompressed format in the storage device 102. The indication 120 of host data for the write compressed data command may be the compressed data. In still another example, the reduced host data command 114 may be a write encrypted data command, wherein the indication of host data includes encrypted host data.

The administrative command 116 may be any type of command other than the host data command 112 and the reduced host data command 114. A first example of the administrative command 116 may be an identify command that returns a data buffer describing a storage device controller 122 included in the storage device 102, namespace capabilities and statuses, or a list of active namespace identifiers. A second example of the administrative command 116 may be an abort command that aborts a previously received command. A third example of the administrative command 116 may be a free data block command that identifies logical data blocks as being free or unassociated with a file in a file system. A fourth example of the administrative command 116 may be a create volume command that creates a logical storage volume in the storage device 102.

The storage device 102 may include the storage device controller 122 that handles communication over the bus 106, a storage memory 126 on which the host data 118 is stored, and a memory controller 124 for the storage memory 126.

The storage memory 126 may be any computer-readable memory for storing and retrieving data or any combination thereof. The storage memory 126 may include non-volatile and/or volatile memory, such as a random access memory (RAM), solid state memory, or flash memory. Alternatively or in addition, the storage memory 126 may include a magnetic (hard-drive) or any other form of data storage device.

The memory controller 124 may be any hardware or combination of hardware and software that translates logical addresses, such as logical block addresses (LBAs), which are received from the host 104, into appropriate signaling to access corresponding physical locations, such as sectors, of the storage memory 126. Examples of the memory controller 124 may include a flash memory controller, a NAND (Negated AND or NOT AND) controller, a NOR (Not OR) controller, and a disk controller.

The storage device controller 122 may be a hardware component that receives data from the host system 104. The data received may include the command 110, the host data 118, the indication 120 of host data, and/or any other type of data. The storage device controller 122 may also be a component that transmits data to the host system 104. In some examples, the storage device controller 122 may be a bus controller, such as a bus controller in a computer peripheral. The storage device controller 122 may be a NVM Express controller, a Serial Advanced Technology Attachment (also known as a Serial ATA or SATA) controller, a SCSI (Small Computer System Interface) controller, a Fibre Channel controller, an INFINIBAND® controller (INFINIBAND is a registered trademark of System I/O, Inc. of Beaverton, Oreg.), a PATA (IDE) controller, or any other type of storage device controller. The storage device controller 122 may include a command parser 128, a buffer 130, firmware 132, a processor 134, and a Direct Memory Access (DMA) circuit 136.

The command parser 128 may be a module that classifies or otherwise determines a type of the command 110 received from the host 104 over the bus 106. The buffer 130 may store the host data 118 received from the host 104 over the bus 106.

The firmware 132 may be hardware that includes computer code executable by the processor 134. The DMA circuit 136 may be any circuit that copies data independently of the processor 134 from the storage device controller 122 to a backend memory 138. The backend memory 138 may include any memory outside of the storage device controller 122 but within or coupled to the storage device 102. In a first example, the backend memory 138 may be a cache 140 included in, or used by, the memory controller 124. In a second example, the backend memory 138 may be included in the storage memory 126. Alternatively or in addition, the backend memory 138 may include memory other than the cache 140 and/or the storage memory 126.

The DMA circuit 136 may include an input selector 142, a data generator 144, and a metadata generator 146. The input selector 142 may be any component that outputs a selected one 148 of the host data 118 and data 150 generated by the data generator 144. The input selector 142 may be a multiplexer (MUX), for example.

The data generator 144 may be any component that generates the host data 118 from the indication 120 of host data. For example, the data generator 144 may be a pattern generator that generates a pattern as the host data 118. Alternatively or in addition, the data generator 144 may be a decryption engine that decrypts encrypted host data included in the indication 120 of host data into the host data 118. Alternatively or in addition, the data generator 144 may be decompression engine that decompresses compressed host data included in the indication 120 of host data into the host data 118 in uncompressed format.

The metadata generator 146 may be any component that generates metadata from the selected one 148 of the host data 118 or the data 150 generated by the data generator 144. Examples of the metadata may include cyclical redundancy check (CRC) data, an end-to-end data protection block, or any other data integrity check information.

During operation of the system 100, the storage device 102 may receive the command 110 from the host 104. The command parser 124 in the storage device controller 122 may identify the command 110. If the command 110 is the host data command 112 or the reduced host data command 114, then storage device controller 122 may activate the DMA circuit 136 to execute the command 110. Alternatively, if the command 110 is the administrative command 116, then the processor 134 together with the firmware 132 may execute the command 110.

If the command 110 is the host data command 112, then the host data 118 received from the host 104 is stored in the buffer 130 of the storage device controller 122. In the DMA circuit 136, which was activated, the input selector 142 may select the host data 118 as the selected output 148. The metadata 146 may generate metadata from the selected output 148. The DMA circuit 136 may copy the metadata and the selected output 148 to the backend memory 138.

If the command 110 is the reduced host data command 114, then the data generator 144 in the activated DMA circuit 136 may generate the host data from the indication 120 of host data. The input selector 142 may select the output data 150 from the data generator 144 as the selected output 148. The metadata 146 may generate metadata from the selected output 148. Therefore, the metadata generator 146 may generate the metadata regardless of whether the command 110 is the host data command 112 or the reduced host data command 114. In other words, the metadata generator 146 may generate the metadata regardless of whether the host data 118 is received from the host 104 or generated by the data generator 144. The DMA circuit 136 may copy the metadata and/or the selected output 148 to the backend memory 138.

The system 100 may be implemented with additional, different, or fewer components. For example, the system 100 may include the storage device 102 without the host 104. In another example, the system 100 may just include the storage device controller 122.

The processor 134 may be a microcontroller, a general processor, a central processing unit, an application specific integrated circuit (ASIC), a digital signal processor, a field programmable gate array (FPGA), a digital circuit, an analog circuit, or any combinations thereof.

The processor 134 may be one or more devices operable to execute logic. The logic may include computer executable instructions or computer code embodied in the firmware 132 or in other memory that when executed by the processor 134, cause the processor 134 to perform the features of the firmware 132. The computer code may include instructions executable with the processor 134.

Each component may include additional, different, or fewer components. For example, the DMA circuit 136 may not include the data generator 144, the input selector 148, and the metadata generator 146. Instead, the data generator 144, the input selector 148, and the metadata generator 146 may provide the selected output 148 of the input selector 148 and the metadata to the DMA circuit 136, which copies the selected output 148 and the metadata to the backend memory 138.

In some examples, the DMA circuit 136 may include the metadata generator 146 but not the data generator 144 and not the input selector 148. The storage device controller 122 may include the buffer 130, the data generator 144, and the DMA circuit 136, but not the input selector 148. The data generator 144 may generate the host data 118 from the indication 110 of host data into the buffer 130 that normally stores the host data 118 when the host data 118 is received from the host 104. The DMA circuit 136 may be activated after the data generator 144 generates the host data 118. The metadata generator 146 may monitor the buffer 130 and/or an input bus to the DMA circuit 136 for the host data 118. Accordingly, the metadata generator 146 may generate the metadata regardless of whether the host data 118 is received from the host 104 or generated by the data generator 144. The DMA circuit 136 may copy the host data 118 from the buffer 130 or the input bus to the backend memory 138 along with metadata generated by the metadata generator 146.

In yet other examples, the DMA circuit 136 may not include the metadata generator 146, the data generator 144 and the input selector 148. The storage device controller 122 may include the buffer 130, the data generator 144, the metadata generator 146, and the DMA circuit 136, but not the input selector 148. The data generator 144 may generate the host data 118 from the indication 110 of host data into the buffer 130 that normally stores the host data 118 when the host data 118 is received from the host 104. The DMA circuit 136 may be activated after the data generator 144 generates the host data 118. The metadata generator 146 may monitor the buffer 130 and/or an input bus to the DMA circuit 136 for the host data 118. Accordingly, the metadata generator 146 may generate the metadata regardless of whether the host data 118 is received from the host 104 or generated by the data generator 144. The DMA circuit 136 may copy the host data 118 from the buffer 130 or the input bus to the backend memory 138 along with metadata generated by the metadata generator 146.

The system 100 may be implemented in many different ways. Each module, such as the command parser 128, the firmware 132, the data generator 144, and the metadata generator 146 may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware that comprises instructions executable with the processor 134 or other processor to implement one or more of the features of the module. When any one of the modules includes the portion of the memory that comprises instructions executable with the processor, the module may or may not include the processor. In some examples, each module may just be the portion of physical memory that comprises instructions executable with the processor 134 or other processor to implement the features of the corresponding module without the module including any other hardware. Because each module includes at least some hardware even when the included hardware comprises software, each module may be interchangeably referred to as a hardware module, such as the command parser hardware 128, the firmware hardware 132, the data generator hardware 144, and the metadata generator hardware 146.

Some features are shown stored in a computer readable storage medium (for example, as logic implemented as computer executable instructions or as data structures in memory). Part of the system 100 and its logic and data structures may be stored on, distributed across, or read from one or more types of computer readable storage media. Examples of the computer readable storage medium may include a flash drive, a cache, volatile memory, non-volatile memory, RAM, flash memory, or any other type of computer readable storage medium or storage media. The computer readable storage medium may include any type of non-transitory computer readable medium, such a volatile memory, a non-volatile memory, ROM, RAM, or any other suitable storage device.

The processing capability of the system 100 may be distributed among multiple entities, such as among multiple devices, processors, and/or memories, optionally including multiple distributed processing systems. Parameters and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors.

Figure 2:
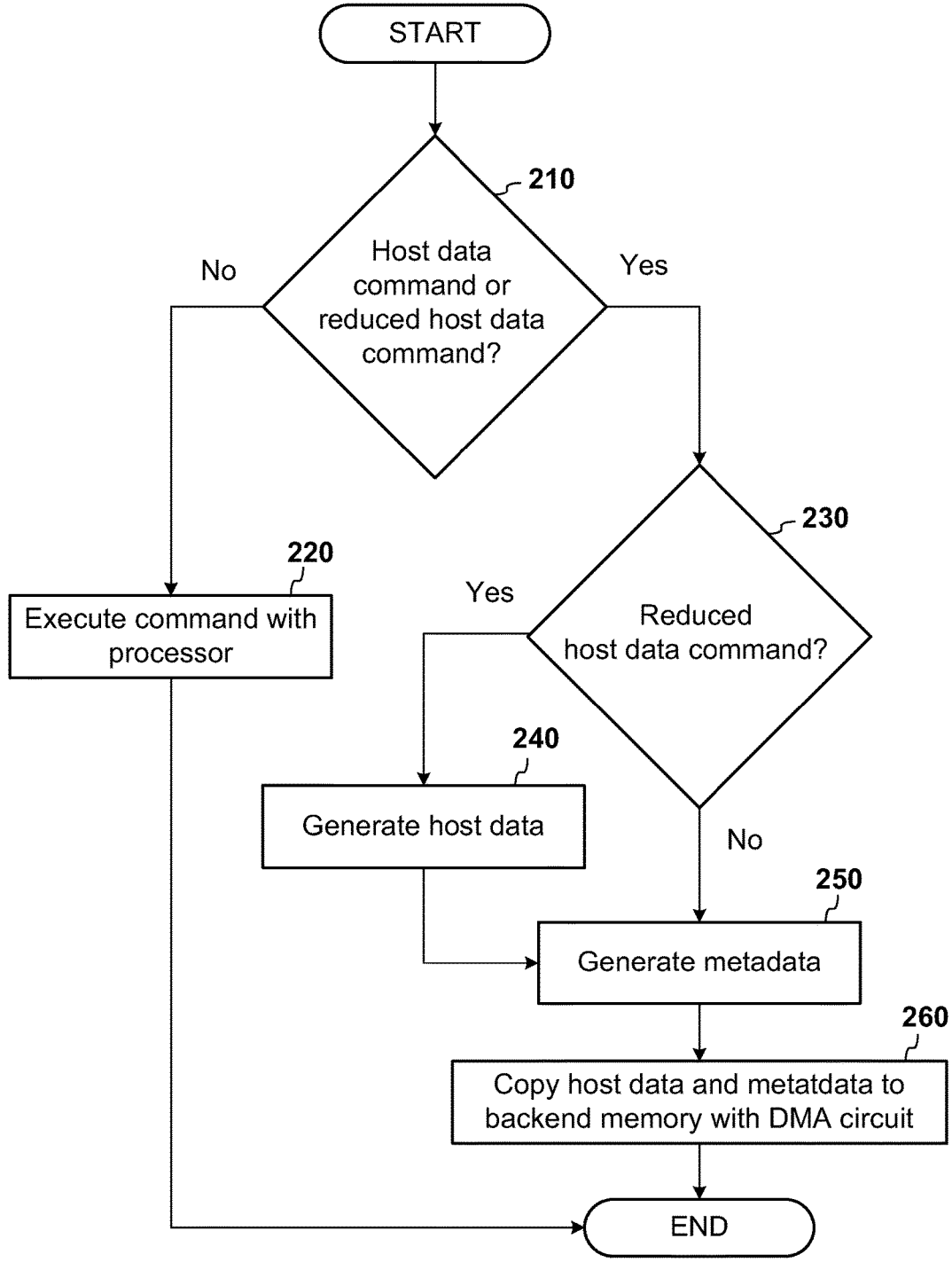
FIG. 2 illustrates a flow diagram of example logic of a storage system.

FIG. 2 illustrates a flow diagram of example logic of the storage system 100. Operations may begin with a determination (210) whether the bus protocol command 110 is the host data command 112 or the reduced host data command 114.

If the command 110 is not the host data command 112 or the reduced host data command 114, then the command 110 may be executed (220) with the processor 134. Alternatively, if the command 110 is the host data command 112 or the reduced host data command 114, then a determination (230) may be made whether the command 110 is the reduced host data command 114.

If the command 110 is the reduced host data command 114, then the host data 118 may be generated (240). Otherwise, if the command 110 is not the reduced host data command 114, then the command 110 is the host data command 112 and the host data 118 may be received by the host 104 instead of generated.

Because the host data 118 is generated or is received from the host 104, the metadata may be generated (250) from the host data 118. The metadata and/or the host data 118 may be copied (260) by the DMA circuit 136 into the backend memory 138.

Operations may end by, for example, waiting to receive a next bus protocol command over the bus 106. To execute the next bus protocol command, operations may start again with the determination (210) whether the bus protocol command 110 is the host data command 112 or the reduced host data command 114.

The logic may include additional, different, or fewer operations than illustrated in FIG. 2. For example, the operations may include just generating the host data (240) when the command 110 is the reduced host data command 114, generating (250) the metadata, and copying (260) the metadata and/or the host data 118 with the DMA circuit 136 into the backend memory 138. The operations may be executed in a different order than illustrated in FIG. 2.

All of the discussion, regardless of the particular implementation described, is exemplary in nature, rather than limiting. For example, the various modules described are but one example of arrangement of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Furthermore, the components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A storage system comprising:
   a buffer configured to store host data responsive to the host data being received from a host over a bus;
   a backend memory for data storage;
   a processor; and
   a Direct Memory Access (DMA) circuit configured to copy data to the backend memory independently of the processor, the DMA circuit comprising:
      a data generator configured to generate the host data responsive to the host data not being received from the host, wherein the DMA circuit is configured to:
         copy the host data generated by the data generator to the backend memory independently of the processor responsive to the host data not being received from the host; and
         copy the host data in the buffer to the backend memory independently of the processor responsive to the host data being received from the host; and
      a metadata generator configured to:
         generate the metadata from the host data that is in the buffer responsive to the host data being received from the host; and
         generate the metadata from the host data that is generated by the data generator responsive to the host data not being received from the host.

2. The storage system of claim 1, wherein the data generator is further configured to generate a pattern in the host data, the pattern indicated by a bus protocol command received from the host over the bus.

3. The storage system of claim 2, wherein:
   the bus protocol command is a write zeros command; and
   the pattern generated comprises zeros.

4. The storage system of claim 1, wherein the data generator is further configured to generate the host data as uncompressed data responsive to compressed host data being received from the host over the bus.

5. The storage system of claim 1, wherein the metadata generated by the metadata generator comprises data integrity check information.

6. The storage system of claim 1, wherein:
   the processor is configured to execute logic included in firmware, the logic executable to perform a bus protocol command responsive to the bus protocol command being any of a first set of commands;
   the bus protocol command is received from the host over the bus; and
   the DMA circuit is further configured to copy data to the backend memory independently of the processor responsive to the bus protocol command being any of a second set of commands.

7. The storage system of claim 6, wherein the bus protocol command complies with a Non Volatile Memory Express (NVME) standard.

8. A bus controller comprising:
   a buffer configured to store host data responsive to the host data being received over a bus;
   a data generator configured to generate the host data responsive to an indication of host data being received over the bus instead of the host data;
   a metadata generator configured to:
      generate metadata based on the host data in the buffer responsive to the host data being received over the bus; and
      generate the metadata based on the host data generated by the data generator responsive to the indication of host data being received over the bus instead of the host data; and
   a Direct Memory Access (DMA) circuit configured to write at least one of the metadata and the host data, which is generated by the data generator or received over the bus, into a backend memory.

9. The bus controller of claim 8, wherein the DMA circuit includes the metadata generator.

10. The bus controller of claim 8 further comprising an input selector, wherein:
    the input selector is configured to selectively output the host data generated by the data generator or the host data received over the bus depending on whether the host data is generated by the data generator or received over the bus; and
    the DMA circuit copies the host data outputted by the input selector to the backend memory.

11. The bus controller of claim 8, wherein the DMA circuit is further configured to write the metadata and the host data to the backend memory in response to receipt of a reduced host data command that includes the indication of host data or in response to a host data command that includes or is received with the host data.

12. The bus controller of claim 8, wherein the indication of host data is a pseudo write command.

13. The bus controller of claim 8, wherein:
    the indication of host data is encrypted host data; and
    the data generator is further configured to decrypt the encrypted host data.

14. The bus controller of claim 8 further comprising a processor, wherein the DMA circuit is configured to write the metadata and the host data into the backend memory independently of the processor.

15. A method to process reduced host data commands, the method comprising:
    executing a reduced host data command with a Direct Memory Access (DMA) circuit independently of a processor that executes administrative commands, wherein the reduced host data command is received over a bus, and wherein executing the reduced host data command comprises:
    generating host data based on an indication of host data received over the bus;

generating metadata based on the generated host data responsive to the host data not being received over the bus;

generating the metadata based on the host data responsive to the host data being received over the bus; and writing at least one of the generated host data and the generated metadata into a backend memory with the DMA circuit.

16. The method of claim 15, wherein generating the host data comprises generating a pattern indicated by the indication of host data.

17. The method of claim 15, wherein the indication of host data includes the reduced host data command.

18. The method of claim 15, wherein generating the metadata comprises generating the metadata with the DMA circuit.

19. The method of claim 15, wherein generating the host data comprises unencrypting decrypted data included in the indication of host data.

20. A system for executing a reduced host data command with a Direct Memory Access (DMA) circuit independently of a processor that executes administrative commands, wherein the reduced host data command is received over a bus, the system comprising:

means for generating host data based on an indication of host data received over the bus;

means for generating metadata based on the generated host data responsive to the host data not being received over the bus;

means for generating the metadata based on the host data responsive to the host data being received over the bus; and means for writing at least one of the generated host data and the generated metadata into a backend memory with the DMA circuit.

\* \* \* \* \*